Figure 3:
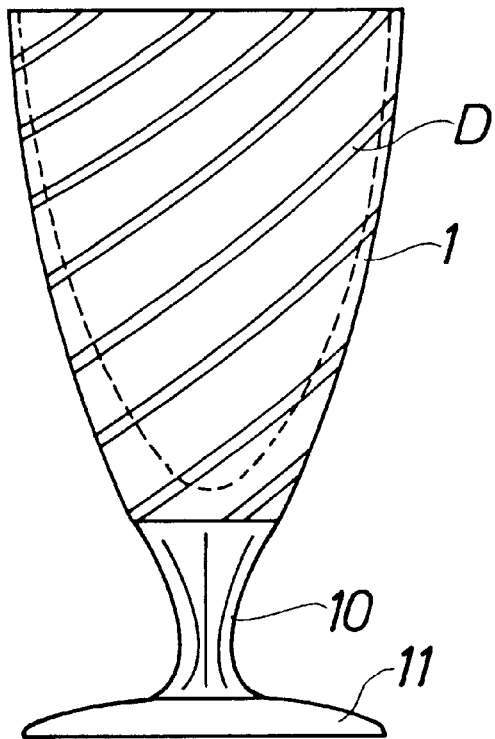

United States Patent

Marcolin et al.

[11] Patent Number: 5,983,674
[45] Date of Patent: Nov. 16, 1999

[54] METHOD FOR THE MANUFACTURE OF OBJECTS OF GLASS OR CRYSTAL

[75] Inventors: Giuseppe Marcolin, Salzburg, Austria; Benito Marcolin, Vadstena, Sweden

[73] Assignee: Marcolin FM Aktiebolag, Konneby, Sweden

[21] Appl. No.: 08/849,763

[22] PCT Filed: Dec. 13, 1995

[86] PCT No.: PCT/SE95/01502

§ 371 Date: Nov. 28, 1997

§ 102(e) Date: Nov. 28, 1997

[87] PCT Pub. No.: WO96/18583

PCT Pub. Date: Jun. 20, 1996

[30] Foreign Application Priority Data

Dec. 13, 1994 [SE] Sweden .................................. 9404330

[51] Int. Cl.[6] .................. C03B 7/00; C03B 9/14; C03B 9/16; C03C 17/00
[52] U.S. Cl. .................. 65/60.1; 65/60.5; 65/72
[58] Field of Search .................. 65/66, 68, 72, 65/60.1, 60.5, 60.8, 47, 48, 243, 227, 122, 355, 361; 264/633, 643, 645

[56] References Cited

U.S. PATENT DOCUMENTS

| 114,140 | 4/1871 | Hobbs et al. | 65/68 |
| 762,925 | 6/1904 | Mygatt | 65/48 |
| 3,034,871 | 5/1962 | Stewart | 65/68 |
| 4,288,238 | 9/1981 | Klepsch | 65/68 |

*Primary Examiner*—Peter Chin
*Assistant Examiner*—Jacqueline A. Ruller
*Attorney, Agent, or Firm*—Laurence R. Brown

[57] ABSTRACT

Method for the application of colored or uncolored decorations of transparent, opaque or opal glass or crystal glass to objects of preferably blown, press-casted, injection molded or centrifugally casted glass or crystal, according to which the object after an initial forming step is placed in a substantially tight fitting form (3), along the form surface of which decorational glass is pressed into created spaces (4) and fills the same. The invention also related to an arrangement for carrying out the method.

10 Claims, 5 Drawing Sheets

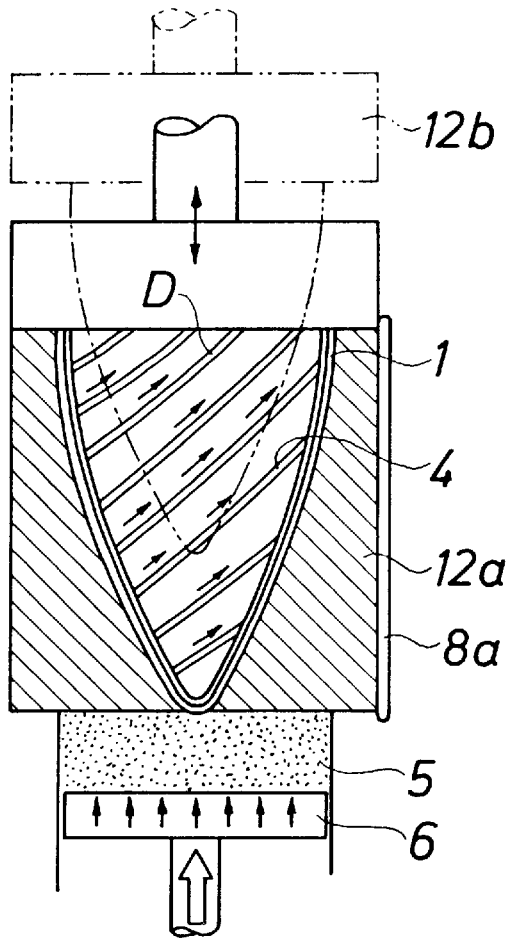
FIG. 1
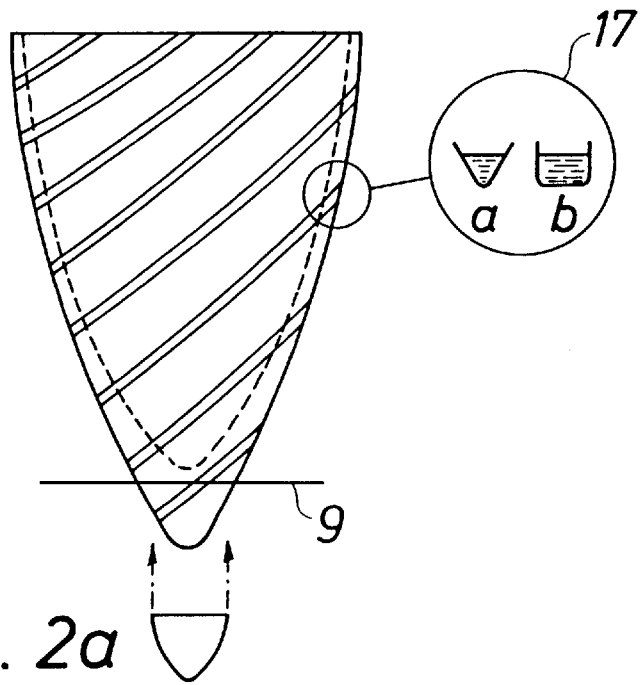
FIG. 2
FIG. 2a

METHOD FOR THE MANUFACTURE OF OBJECTS OF GLASS OR CRYSTAL

The present invention relates to a method for the application of coloured or uncoloured decorations of transparent, opaque or opal glass or crystal glass to pressed casted, injection moulded, blown or moulded objects of glass or crystal glass objects. The invention also relates to an arrangement for producing objects decorated in such a way by the use of the method.

The manufacture of multi coloured or differently coloured objects of glass, preferably objects of art glass in larger series, is presently in principle not possible with available methods. The reason is that by tradition such objects have been produced as a purely manual work and that methods for rationalization have have been missing as well as not developed. Consequently, when the glass objects should be provided with coloured decorations, they were decorated either by painting or by the production of a paintable raw material, or by applying the glass decorations manually in connection with the production of the raw material while this still had a high temperature. Both these methods require the mobilization of extensive resources as well as strain. In the first case the painted decoration must be subjected to a second burning in order to harden the glass and in the second case an extensive workmanship as well as artistic ability is required in order to achieve the results intended.

The main object of the invention is consequently to accomplish a method of the above mentioned kind, which enables the production of art or utility glass goods with one, two or several colours, the goods per se being produced by conventional methods, such as pressing injection moulding blowing, or molding, separately or in combination.

Another object of the invention is to accomplish an arrangement for creating a possibility to produce—by means of said method—single or multicoloured finished articles or semimanufactured articles industrially, which in a later phase can be finished off and/or decorated with conventional methods by machine or manually, such as by grinding, blasting, painting or applying of additional decorations of glass of all possible kinds.

Without going into detail it should be mentioned that by using the hereby described method and arrangement for its realization, it becomes possible to produce art glass on a large scale which earlier has been possible only manually. For obvious reasons this leads to an essential rationalization of the production as well as a big cost advantage.

Figure 4:
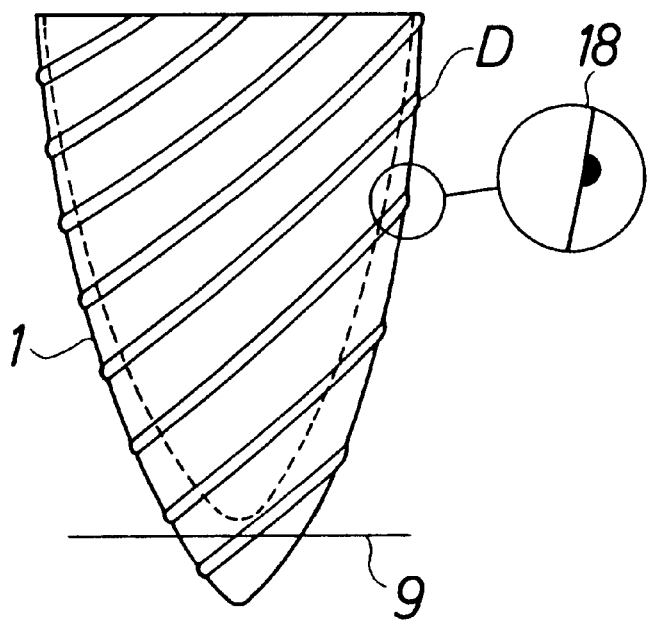
Figure 5:
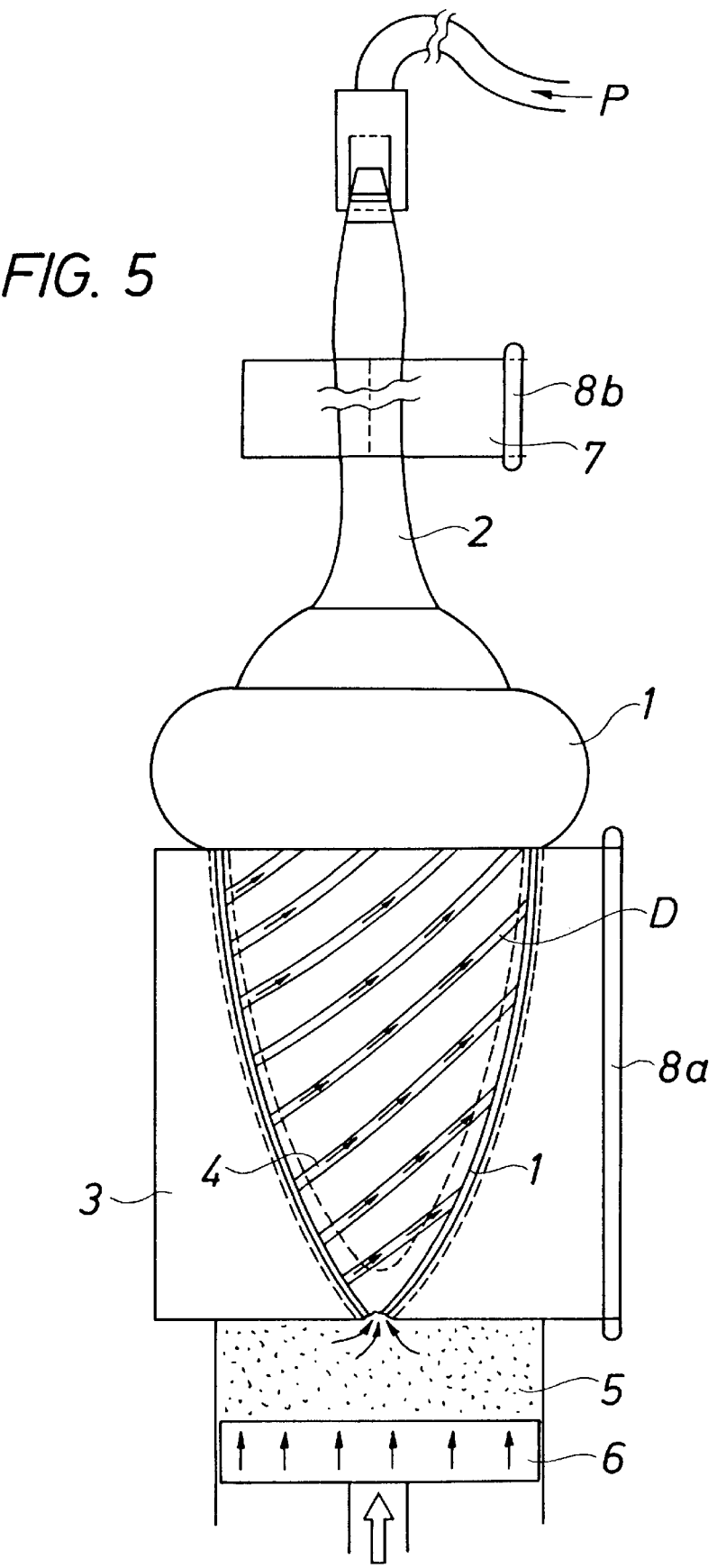
Figure 6A:
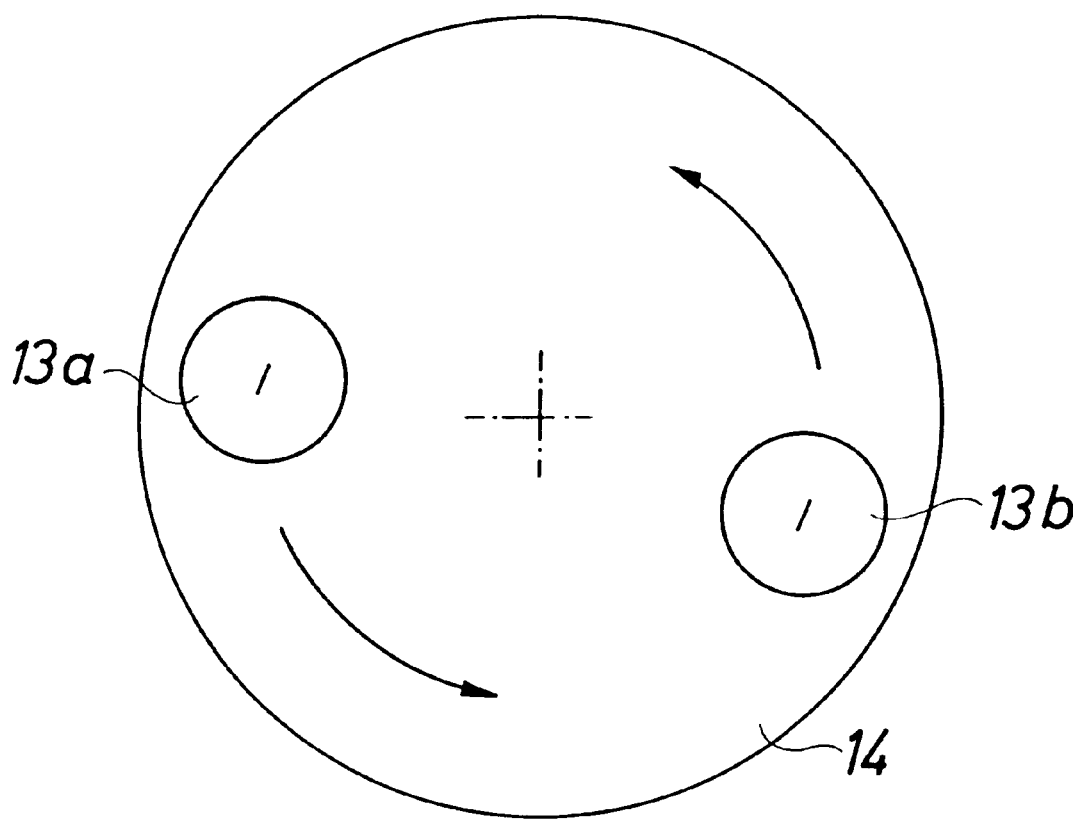
Figure 6B:
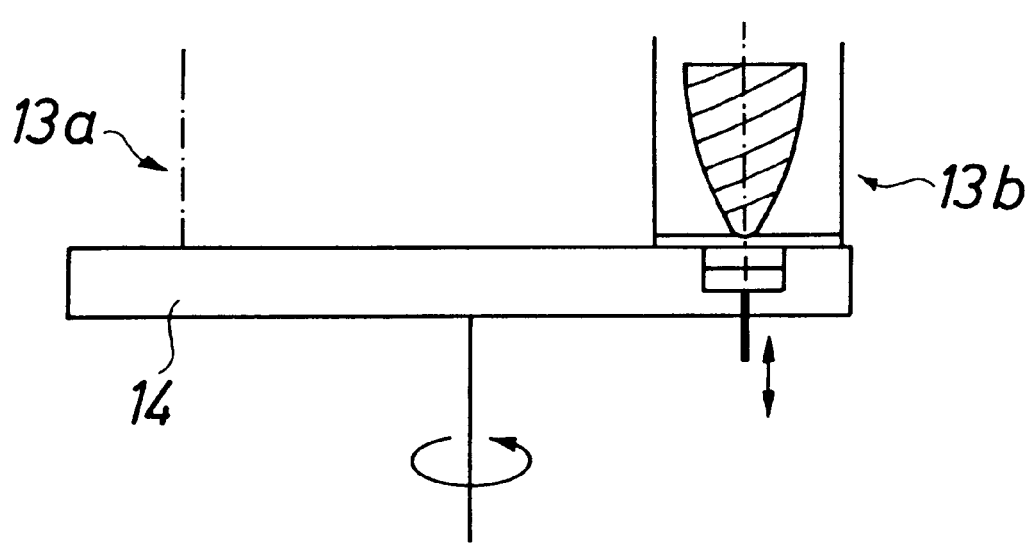
Figure 7A:
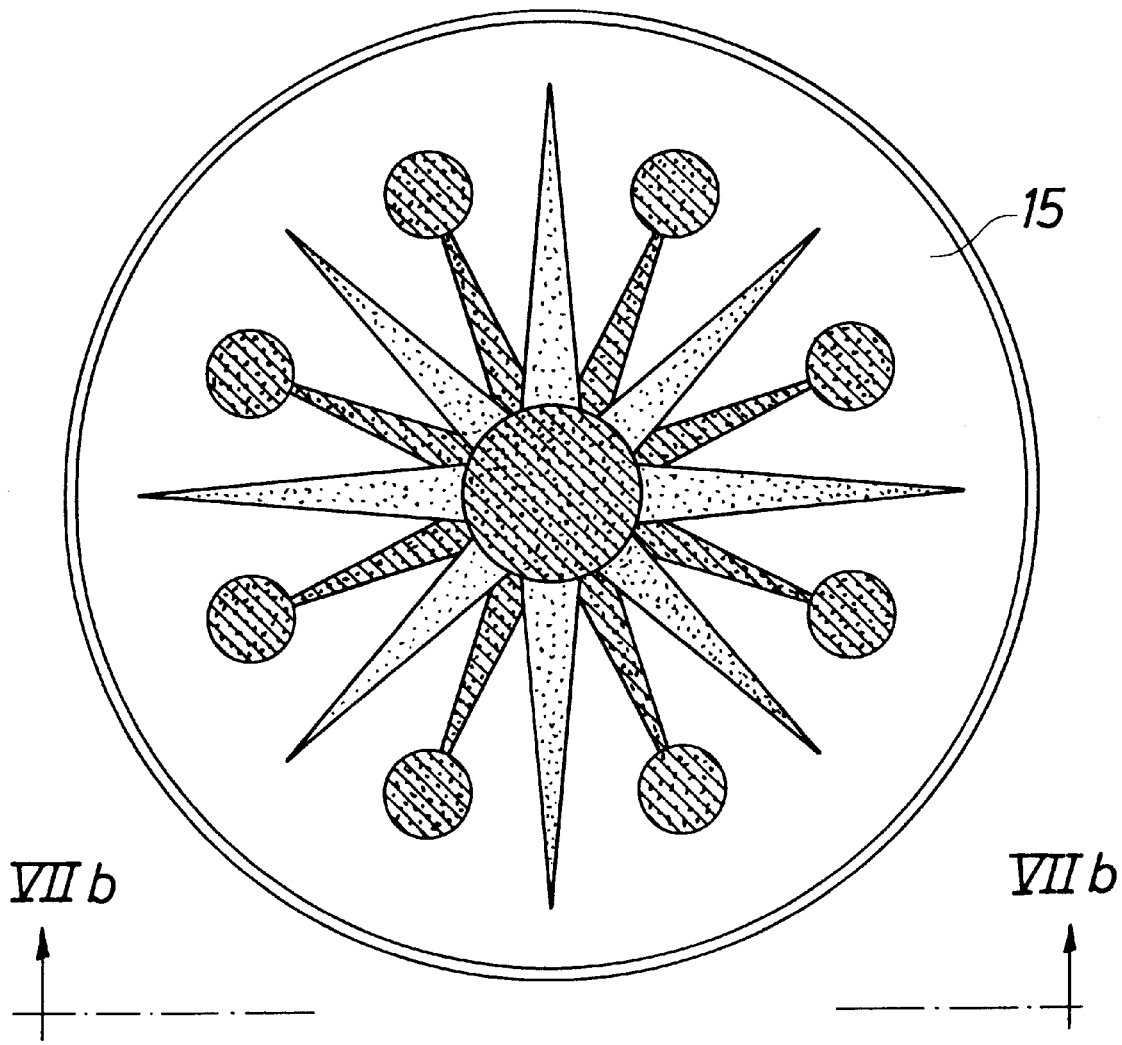
Figure 7B:
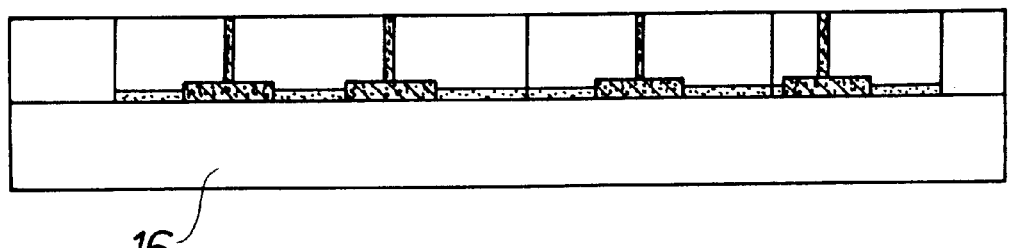

In the following the invention will be described more in detail with reference to the accompanying drawings showing embodiments which are not delimiting to the invention, where:

FIG. 1 shows a view of a principal arrangement for preparation of a glass decoration on a cup or a wine glass manufactured by moulding, FIG. 2 shows the design of a glass cup for a wine glass according to FIG. 1 in order to make the decoration possible, FIG. 2a shows a massive metallic insert which can be used in order to avoid penetration of the decoration goods, FIG. 3 shows the glass cup according to FIG. 2 being provided with an appropriate foot, FIG. 4 shows a glass cup analogous to the cup according to FIG. 2 with the decoration differently made, FIG. 5 is a schematic view showing a rig for applying a positive decoration (i.e. on the outside of a smooth surface) to the outside of a glass object produced by blowing, FIGS. 6a and 6b show an arrangement and means for making a timely correct operation sequence possible when applying the method according to the invention, FIG. 7a shows a rotationally symmetrical body with a geometrically dependent decoration which has been prepared by use of the method according to the invention, and FIG. 7b shows a view from VIIb VIIb in FIG. 7a.

FIG. 1 shows the principle how to manufacture a glass cup 1 by pressing, in order to create a glass for e.g. beverages, and how a glass cup or a starting material 1 by injection according to the invention in this case is given a helical decoration D of additional glass material, which sticks to a channel 4, which in this embodiment is formed on the outside of the glass to coincide with the decoration. Glass is gathered with a gathering stick in a known manner and is placed in a form for press forming. The glass cup 1, which in this case is fairly simple, is formed by two forms portions 12a, 12b (which in themselves may be subdivided) arranged in a stand (not shown), namely a bottom mold 12a and a top mold 12b (neither shown more closely nor desribed) by pressing with the top mold 12b (which is shown also in a withdrawn position), on the mass of glass quite recently placed in the form. The cup 1 created by the pressing is as soon as possible thereafter placed in another form, which mainly coincides with the form in which the cup 1 recently has been pressed. The difference between them is that the new form is smooth or substantially smooth for enabling the introduction of decorational glass into the recesses in the pressed starting material/glass cup 1 in order to create a decoration D. The introduced material is injected from a cylindrical space 5 containing melted decorational glass, under the influence of a plunger 6 which is positively movable in the space 5. The plunger 6 is driven in a suitable manner (not shown), for example by pressurized air. It should be noted that the decorational glass is added to the cylinder 5 after or in connection with the arrangement of the glass cup 1 in the form part 12, more precisely between 0–15 seconds thereafter, whereby the glass material has a temperature of between 1150° C. and 1200° C., which gives it a viscosity allowing the decorational glass to easily slide out into the decoration under the influence of the force from the plunger 6. The pressure of the plunger 6 is maintained only during the time needed for filling the entire intended decoration with decorational material. The actual time varies of course depending on the complexity of the decoration and its degree of coarseness, but 5–10 seconds is normal. It is however important that the pressure is not maintained too long, since in a case like the one showed this may lead to the penetration of the bottom of the cup 1 by melted decorational glass, so that the cup is destroyed. For avoiding this the glass cup 1 may be made thicker in the area for the injection, as can be seen in FIG. 2 and FIG. 5. Alternatively, the extra thick, conical bottom of the cup may be replaced by a massive, metallic and hot insert, according to FIG. 2a. It should further be noted that the form 12b, in a manner known in connection with injection, contains airing holes (not shown) at suitable places in order to avoid air bubbles or poor filling in the completed decoration. Said airing holes may preferably be connected to a source of air having a subatmospheric pressure, which further promotes the filling.

FIG. 2 also shows in a detail enlargement 17 how in this embodiment a recess in the starting material, in this case the cup 1, during the injection of the decorational material is intended to be partly filled with this material. This is accomplished in that the bottom mold 12a is given a positive pattern which coincides with but does not fill the decoration and therefore delimits the filling. It is further shown that the cup 1 after the decoration injection and after cooling is cut off in order to create an even surface which either may serve as a bottom surface for standing purposes or as a surface for the application of yet further details of glass, as will be described below.

FIG. 3 shows that the cup thereafter in a conventional way is provided with a leg 10 and a foot 11. The arrangement of the leg 10 and the foot 11 is not necessary as such, but of course suitable in order to create for example a wine glass. If the cup has a size that is suitable for the purpose, it may of course also form for example a vase or a dish with or without a leg and a foot, if the design so admits.

As can be seen in FIG. 4 the decoration may as well be performed as a bead formation applied on the outside of a starting material, for example a cup 1. The cup is hereby formed by conventional glass blowing technique, whereby in order to create the starting material or the cup 1, melted glass is gathered on a glass blower pipe 2 (FIG. 5) of conventional type and under rotation is blown in a manner, which is known and therefore is not shown here, in order to form a cup 1. The cup is thereafter placed in a rig 3, 7 shown in FIG. 5 which where approprite allows the navel N of the glass blower pipe to remain on the starting material or the cup 1, since the details 3 and 7 are connected to each other by a support (not shown). Thereafter the cup 1 is further blown during rotation until it completely fills out a form portion 3 contained in the rig, and in which the cup 1 has been placed. Thereafter the mouthpiece on the glass blower pipe is connected to a controllable, conventional source of pressurized air p, which applies an inner pressure and which aims at reacting to the pressure produced on the glass cup by the decorational glass when injected in order to create the decoration.

From FIG. 5 can also be seen that the glass blower pipe 2 preferably is given a radial support 7 along its length for avoiding that the starting material is cracked or in some other way is subjected to unnecessary stresses, such as when connected to the source of pressurized air, after the material has been arranged in the form portion 3. Both the radial support 7 and the form 3 may be divided in the length direction of the pipe 2 via hinges 8a, 8b, and the support 7 has a permanent magnet (not shown) so arranged, that when the form 3 and the support 7 are divided in order to take out the completely decorated cup 1, the pipe with the cup being still fixed, without any risk of spontaneously loosening from the rig after the division of the form. After the cup has been completely decorated it is removed from the rig as soon as possible, and the pipe and those parts of the starting material which do not belong to the complete product/cup 1 are separated in a conventional way (not shown), such as that the bottom of the cup is separated along the line 9 (FIG. 4) when the glass has been given a chance to cool. The reason why the starting material preferably is given such a peak shape and possibly a somewhat thicker bottom, is that this together with other measures eliminates or considerably reduces the risk of a penetration of the bottom during injection forming of the decoration. This is true for all types of products where this kind of central injection is made. Injection may of course also be done at several different spots on a product, and the form 3 may also include heaters (not shown), preferably gaseous, in order to facilitate the flow of the injected decorational glass.

After the injection decoration, which of course may have a form and a look which widely differs from the one shown here, further treatment, such as operations that are difficult or impossible to perform with the injection molding, for example application of pistilles and stamens on a flower, may be performed manually. Yet another very thin coloured or uncoloured glass layer may as well be applied on the outside of the decoration, irrespective of whether this is located in tracks in the starting material or as beads on the same. This gives possibilities to rather simply create the most fantastic decorations. It should be mentioned that defects that may occur especially with pressed starting materials, easily can be eliminated with conventional post heating methods, as for example heat treating possibly followed by acid cleaning or acid treatment.

FIG. 6 shows an arrangement for producing products decorated according to the principle and the method above. It is essential for the result that the production and the starting material and the decoration are performed in as close a relation to each other as possible. The reason for this is that the starting material and especially the decorational glass are not allowed to cool to any essential extent during the production. The reason for this is in turn that firstly the injection glass must be able to slide out evenly and quickly, and secondly that it must bind well to the starting material. Consequently the starting material is preformed at one of two stations 13a, 13b on a rotationable table 14 in such a way, that it becomes possible to—in immediate connection to each other—first manufacture the starting material according to anyone of the above described methods, and thereafter perform the injection decoration. Especially with the blown cup 1 according to the above, it may thereafter be suitable to apply further decorations and/or further glass layers on the outside of the decoration manually.

Finally, FIGS. 7a and b show yet another example of an application of the present invention. In this drawing a plane rotationally symmetrical body 15 of pressed or crystal glass is shown. In the pressing operation the body has been given a negative pattern on one side, wherefrom parts of the geometrically dependent pattern on the pattern side of the body may be given limitations in its outer delimiting plane which makes injection decoration possible with several colours and/or types of glass. FIG. 7b is a view from VIIb—VIIb in FIG. 7a and shows how the special parts in the geometrical pattern in this case carries differently vivid colouring.

FIG. 7b also shows that the surface of the body 15 carrying a negative pattern preferably is given a sealing surface 16 consisting of either opal or opaque glass or crystal glass or some other background or foreground material which possibly prevents transparency. When the body 15 has been given its final composition it is finally also possible to form the body in different ways into a desired shape, for example a dish.

Within the embodiment shown in FIG. 7 also other forms may be produced, as for example polygonal, in order to create a more or less mosaic alike tiles that are suitable as replacement material for what today generetically is called tile ware or wall plates.

We claim:

1. The method of decorating at least one wall of a glass object comprising the steps of,
   placing the glass object in a rigid form defining shaped gaps between the form and one wall of the glass object for receiving decorative materials, and
   injecting into the gaps between the form and glass object a decorative liquified material that bonds with the glass object thereby forming a unitary shaped glass object with a decorative pattern on said one wall.

2. The method of claim 1 further comprising the steps of starting with a rigid form of smooth surface walls and a glass object having shaped walls that form a pattern of the defined shaped gaps between the form and the glass.

3. The method of claim 1 further comprising the steps of starting with a smooth glass wall and a form having shaped wall surfaces that form said gaps.

4. The method of claim 1 further comprising the steps of producing decorations on the glass walls of contrasting color by injecting a colored liquified material.

5. The method of claim 1 wherein the injecting step further comprises attaching adjacent the rigid form a reservoir for containing molten glass and a plunger for forcing said molten glass into said shaped gaps.

6. The method of claim 5 further comprising the step of shaping both the rigid mold and the glass object to have a matching and mated pattern of defined gap shapes partly intruding into the pattern on the glass.

7. The method of claim 1 wherein the object is a glass cup further comprising the steps of coupling a glass blower pipe to blow into the glass cup and adjusting the pressure of a source of pressurized air coupled to the glass blower for reacting against injection pressure encountered in said injecting step.

8. The method of claim 1 further comprising the step of applying a glass layer on the outer surface of the decorated wall of the glass object.

9. The method of claim 1 further comprising the step of forming the shaped gaps on the outside surface of a cup shaped glass object.

10. The method of claim 1 further comprising the step of forming the shaped gaps on the inside surface of a cup shaped glass object.

\* \* \* \* \*